United States Patent
Lin

(10) Patent No.: US 8,419,845 B2
(45) Date of Patent: Apr. 16, 2013

(54) AIR FILTER

(76) Inventor: Tony Lin, Taichung (TW)

( * ) Notice: Subject to any disclaimer, the term of this patent is extended or adjusted under 35 U.S.C. 154(b) by 11 days.

(21) Appl. No.: 13/194,734

(22) Filed: Jul. 29, 2011

(65) Prior Publication Data

US 2013/0025463 A1    Jan. 31, 2013

(51) Int. Cl.
*B01D 46/00* (2006.01)

(52) U.S. Cl.
USPC .................. 96/424; 55/467; 55/471; 55/480; 55/493; 95/284; 95/273; 96/224

(58) Field of Classification Search .................... 55/356, 55/471, 472, 473, 410, 467, 385.1, 385.3, 55/590; 95/284, 273; 96/224
See application file for complete search history.

(56) References Cited

U.S. PATENT DOCUMENTS

| | | | | |
|---|---|---|---|---|
| 3,708,963 | A * | 1/1973 | Boonstra et al. | 55/373 |
| 5,106,512 | A * | 4/1992 | Reidy | 210/744 |
| 5,279,629 | A * | 1/1994 | Stueble | 95/284 |
| 5,529,593 | A * | 6/1996 | Simmons | 55/354 |
| 6,783,578 | B2 * | 8/2004 | Tillman, Jr. | 96/224 |
| 6,824,582 | B2 * | 11/2004 | Wilson | 55/385.3 |
| 8,197,567 | B2 * | 6/2012 | D'Hondt et al. | 55/290 |
| 8,273,144 | B2 * | 9/2012 | Shore et al. | 55/467 |

* cited by examiner

*Primary Examiner* — Duane Smith
*Assistant Examiner* — Minh-Chau Pham

(57) ABSTRACT

The present invention provides an air filter including a main body, a pressure fan, a filter mode and a fixing assembly. The main body has a containing room, an entrance hole and an exit hole. The pressure fan is disposed in the containing room. The filter mode includes a first filter layer, a second filter layer and a frame body. The first filter layer is disposed in the entrance hole, and the second filter layer is disposed in the frame body. As such, users can select to use only the first filter layer or both filter layers at one time. Moreover, users only need to let the frame body pivot to a position away from the entrance hole so that users can change the filter layers faster and easier.

12 Claims, 3 Drawing Sheets

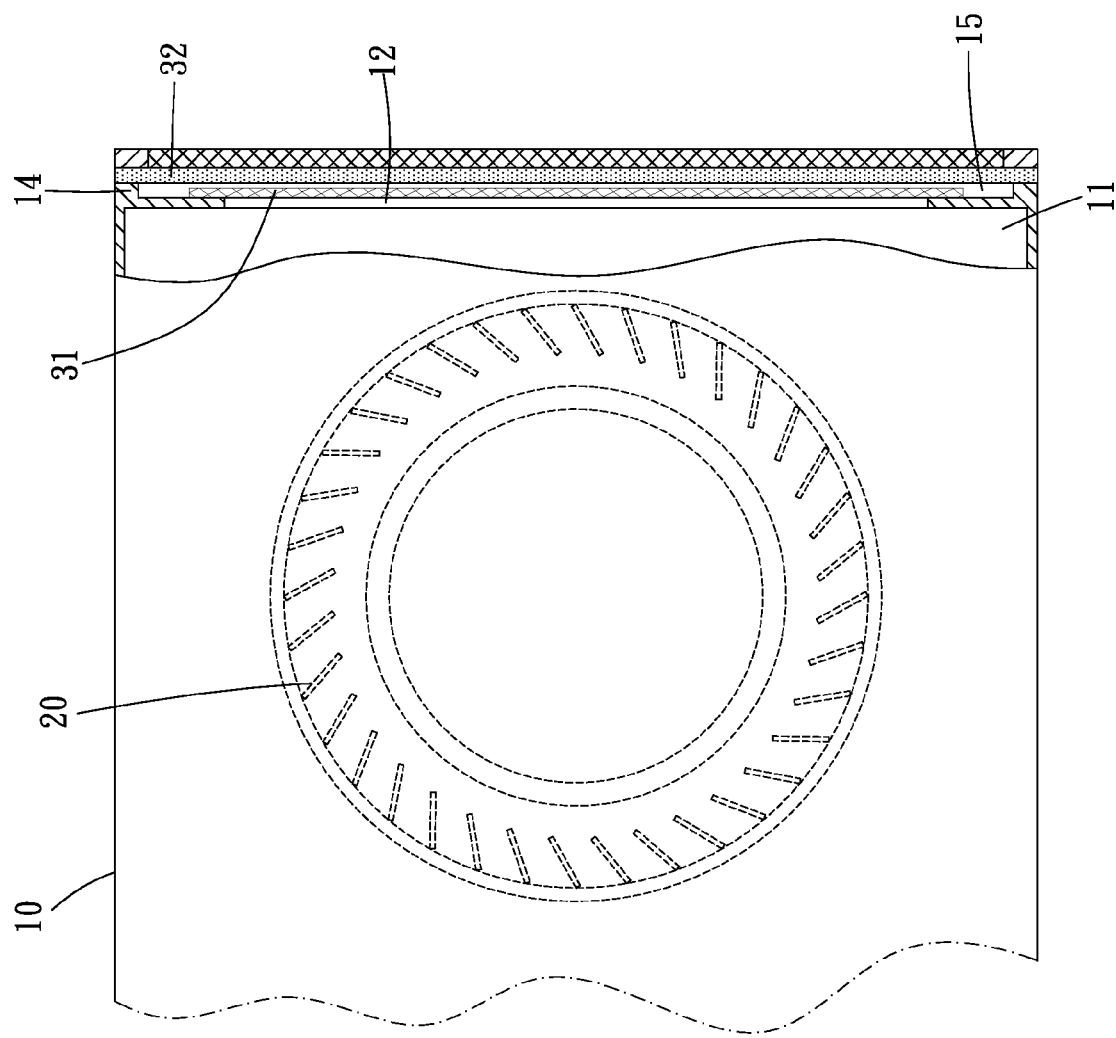

AIR FILTER

BACKGROUND OF THE INVENTION

1. Field of the Invention

The present invention relates to the field of an air filter, and more particularly to an air filter capable of filtering air dust in factories.

2. Description of the Prior Art

Normally speaking, when facilities are working in a factory, a large amount of dust would be produced, causing breathing problems to workers. The working environment would be dirty because of the piled dust.

Thus, an air filter capable of filtering air dust to improve air quality would be necessary. Conventional air filter for the industry is mainly installed with a filter layer in an air entrance hole of a main body. A pressure fan would bring the air dust from the air entrance hole to the filter room, and the air dust goes through the filter layer. Finally, the fresh air goes out from an exit hole. A goal of filtering air is reached.

However, conventional air filter has only one filter layer. Users use cotton filters as the filter layer when they want to filter the air. But sometimes the dust is removed, and users want to use the air filter as an industry ventilator, users have to use a metal net to replace the cotton filters to promote efficiency of the industry ventilator and the lifetime of the cotton filters, preventing entrance of big stuff. Nevertheless, change processes are complex and time-consuming, and the inconvenience is increased for users.

Besides, when the conventional air filter is put to use, users could not see whether the cotton filters collect too many dust to perform filtering function by users' eyes directly. Usually, users would change the cotton filters when they find that the air filter is unable to filter the air dust, At the same time, users or workers have already breathed in a large amount of dust, causing influences on health, Moreover, skin keeping touch with the dust would cause allergy for users, On the other hand, the filter layer of the air filter mentioned above is fixed on the main body by plural screws, Users would spend more time replacing the old filter layer.

As such, the present invention is arisen to obviate or at least mitigate the above mentioned disadvantages.

SUMMARY OF THE INVENTION

The main object of the present invention is to provide an air filter with two filter layers so that functions of the air filter can be switched easier and the filter layer can be changed faster.

To achieve the above, the air filter of the present invention includes a main body, a pressure fan assembly, a filter module and a fix assembly. The main body comprises a containing room, an entrance hole and an exit hole. The entrance hole and the exit hole communicate with the containing room respectively. The pressure fan assembly is disposed in the containing room. The pressure fan assembly leads air to enter the containing room from the entrance hole and go out from the exit hole. The filter module comprises a first filter layer, a second filter layer and a frame body. The first filter layer is located in the entrance hole, and the second filter layer is located in the frame body detachably. The frame body is positioned at one side near the entrance hole of the main body. The frame body is capable of moving pivotally at one side near the entrance hole of the main body. The fix assembly fixes the frame body on the main body selectively. The frame body moves between an opening position and a closing position pivotally. When the frame body is located in the closing position, the frame body closes the entrance hole. The fix assembly fixes the frame body on the main body. When the frame body is located in the opening position, the frame body is away from the entrance hole.

Because one of the two filter layers can pivot with respect to the frame body, the air filter of the present invention enables users to select whether use only the first filter layer (the frame body pivots to the opening position) or use both filter layers (the frame body closes the entrance hole). Besides, when one of the two filters needs to be changed, users only have to pivot the frame body away from the entrance hole so that the filter can be replaced with a new one easily. As such, one of the progressive effects that use ways of the air filter can be switched easier is reached. Another progressive effect that the filter layers can be changed faster is performed as well.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 3 is a cross-sectional drawing showing a preferred embodiment in accordance with the present invention.

DETAILED DESCRIPTION OF THE PREFERRED EMBODIMENTS

Figure 1:
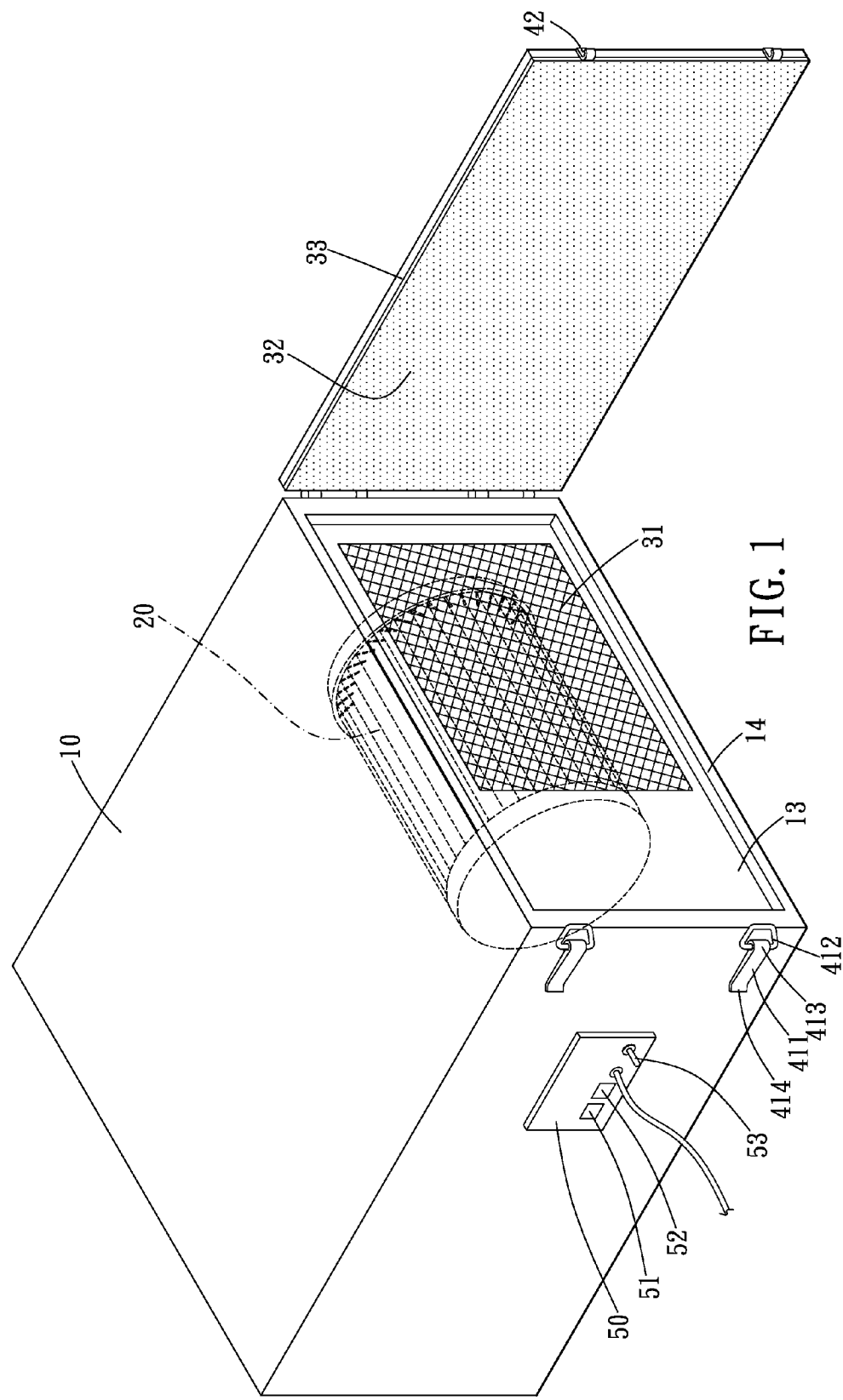
FIG. 1 is a schematic drawing showing a preferred embodiment that the frame body is away from the entrance hole of the present invention.
Figure 2:
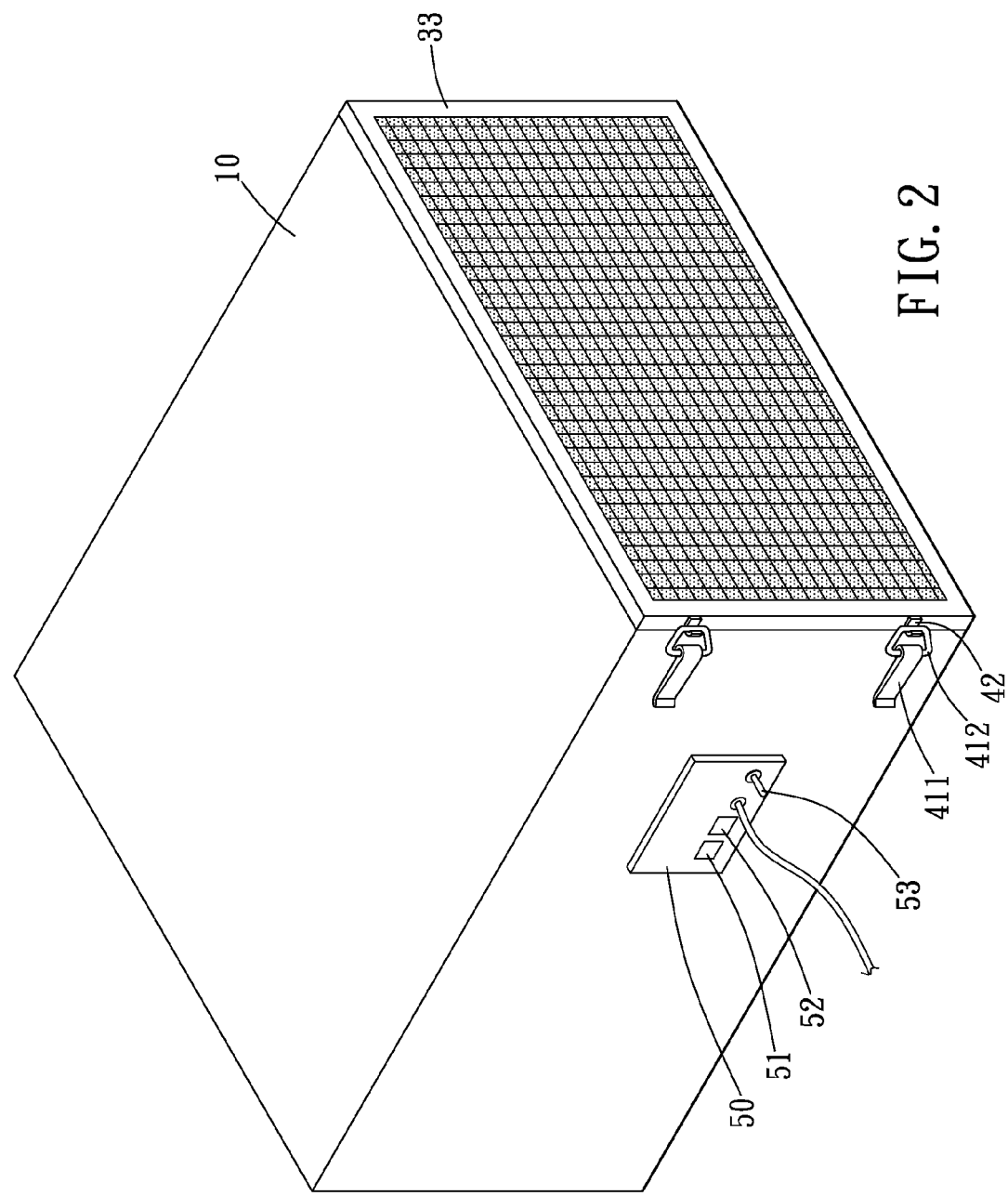
FIG. 2 is a schematic drawing showing a preferred embodiment that the frame body closes the entrance hole of the present invention.

Please refer to FIG. 1, FIG. 2 and FIG. 3, the air filter of the present invention includes a main body 10, a pressure fan assembly 20, a filter module, a fixing assembly and a control panel 50.

The main body 10 has a containing room 11, an entrance hole 12 and an exit hole. The entrance hole 12 and the exit hole communicate with the containing room 11 respectively. In a preferred embodiment, the main body 10 includes a first surface and a second surface 13. The exit hole is located on the first surface, and the entrance hole 12 is located on the second surface 13. A convex part 14 is disposed along an edge of the second surface 13.

The pressure fan assembly 20 is disposed in the containing room 11. The pressure fan assembly 20 can lead air to enter the containing room 11 from the entrance hole 12 and then go out from the exit hole.

The filter module comprises a first filter layer 31, a second filter layer 32 and a frame body 33. The first filter layer 31 is located in the entrance hole 12, and the second filter layer 32 is located in the frame body 33 detachably. The frame body 33 is capable of moving pivotally at one side near the entrance hole 12 of the main body 10. The frame body moves between an opening position and a closing position pivotally. To increase perfection of functions, the second filter layer 32 is located on the inner side of the frame body 33. The inner side of the frame body means a side on the frame body 33 and near the entrance hole 12. In a preferred embodiment, the first filter layer 31 is a metal net, and the second filter layer 32 is a cotton filter. The metal net can be used to prevent big stuffs from going into the containing room. The cotton filter is used to filter the air dust. In other possible embodiments, the cotton filter can be replaced with a filter paper to reach the same effect.

The fix assembly fixes the frame body 33 on the main body 10 selectively. In the preferred embodiment, the fix assembly comprises at least one male buckle and at least one female buckle 42. The female buckle 42 is disposed on one of the main body 10 and the frame body 33. The male buckle is disposed on another one of the main body 10 and the frame body 33. The male buckle includes a lug 411 and a buckle ring 412. The lug 411 comprises a first end 413 and a second end 414, and the first end 413 is pivotally disposed in the main body 10. The buckle ring 412 is pivotally disposed in the first end 413 of the lug 411. The female buckle 42 has a hook-shaped member, and the hook-shaped member is disposed in a distal end of the frame body 33. Of course, structures of the fixing assembly of the present invention are not limited by the structure described above.

The control panel 50 is located on the main body 10. The control panel 50 comprises a setting device 51, a warning device 52 and a switch 53. The setting device 51 can be used to define a pre-determined time of the second filter layer, and the warning device 52 connects to the setting device 51 electrically. The switch 53 can start up or shut down the pressure fan 20. The setting device switches on the warning device when a use time of the second filter layer is over the pre-determined time. The warning device 52 can be a lighting member (For example: LED bulb.), a voicing device, or a device combination of the lighting member and the voicing device. Using other types of the warning device is also an option. By the warning device, users would be informed that the pre-determined time of second filter layer is due. And users can change the second filter to keep a working efficiency of the present invention and a air quality of a factory. Therefore, skin and lungs health of users and employees can be protected from harmful effects of dust.

The frame body 33 pivots about the main body 10 and to a closing position, and the frame body 33 would close the entrance hole 12. When the frame body 33 closes the entrance hole 12, the male buckle and the female buckle would buckle together. The buckle ring 412 buckles in the hook-shaped member so that the frame body 33 is fixed on the main body 10. And then user's hands can hold the second end 414 of the lug to push so that the first end 413 of the lug pivots about the main body 10 and makes the hook-shaped member move to a buckling position. Finally, switching on the switch 53 to start up the pressure fan assembly 20, and the air dust would pass through the second filter layer 32 and the first filter layer 31, going into the containing room 11 from the entrance hole 12. The clean air would go out from the exit hole. Moreover, as shown in FIG. 1 and FIG. 2, the fixing assembly includes two male buckles and two female buckles so as to fix the frame body on the main body firmly.

After the air dust is cleaned, users can detach the male buckle from the female buckle 42. When the male buckle is detached from the female buckle 42, the frame body 33 can pivot with respect to the main body 10 and to an opening position. As shown in FIG. 1, the frame body is away from the entrance hole 12. As such, the air filter of the present invention can be used as an industry ventilator. Because the frame body can be opened, the working efficiency of the pressure fan assembly is promoted. Moreover, the metal net is still disposed in the entrance hole to protect the pressure fan assembly from being invaded by big stuff.

When users are informed by the warning device 52, users only have to pivot the frame body away from the entrance hole so that the filter can be replaced with a new one easily, resolving disadvantages that cause inconvenience on changing cotton filters or filter papers.

As shown in FIG. 1 and FIG. 3, when the frame body 33 closes the entrance hole 12, the frame body abuts against the convex part 14 so that a filter room 15 is defined between the second filter layer 32 and the second surface 13. After the male buckle buckles with the female buckle tightly, the frame body 33 is fixed on the main body 10 firmly in order to make the filter room 15 enclosed by the frame body 33 and the convex part 14 completely. By the filter room 15, functions of the second filter layer would not be influenced by the size of the entrance hole. As a result, the second filter layer would be fully used.

What is claimed is:

1. An air filter, comprising:
a main body, having a containing room, an entrance hole and an exit hole, the entrance hole and the exit hole communicating with the containing room respectively;
a pressure fan assembly, being disposed in the containing room, the pressure fan assembly leading air to enter the containing room from the entrance hole and go out from the exit hole;
a filter module, comprising a first filter layer, a second filter layer and a frame body, the first filter layer being located in the entrance hole, the second filter layer being located in the frame body detachably, the frame body positioning at one side near the entrance hole of the main body, the frame body being capable of moving pivotally at one side near the entrance hole of the main body; and
a fix assembly, the fix assembly fixing the frame body on the main body selectively, wherein the frame body moves between an opening position and a closing position pivotally, when the frame body is located in the closing position, the frame body closes the entrance hole, the fix assembly fixes the frame body on the main body, when the frame body is located in the opening position, the frame body is away from the entrance hole;
wherein the first filter layer is located between the pressure fan assembly and the second filter layer when the frame body is located in the closing position, the first filter layer has first filtering passages, the second filter layer has second filtering passages each having a cross-section area smaller than that of the first filtering passage.

2. The air filter of claim 1, wherein the first filter layer is a metal net, and the second filter layer is a cotton filter or a filter paper.

3. The air filter of claim 1, wherein the main body comprises a first surface and a second surface, the exit hole is positioned on the first surface, the entrance hole is positioned on the second surface; wherein a convex part is disposed along an edge of the second surface, when the frame body closes the entrance hole, the frame body abuts against the convex part so that a filter room is defined between the second filter layer and the second surface.

4. The air filter of claim 2, wherein the main body comprises a first surface and a second surface, the exit hole is positioned on the first surface, the entrance hole is positioned on the second surface; wherein a convex part is disposed along an edge of the second surface, when the frame body closes the entrance hole, the frame body abuts against the convex part so that a filter room is formed between the second filter layer and the second surface.

5. The air filter of claim 3, wherein the fix assembly comprises at least one male buckle and at least one female buckle, the male buckle is disposed on the main body when the female buckle is disposed on the frame body; the female buckle is disposed on the main body when the male buckle is disposed on the frame body.

6. The air filter of claim 4, wherein the fix assembly comprises at least one male buckle and at least one female buckle, the male buckle is disposed on the main body when the female buckle is disposed on the frame body; the female buckle is disposed on the main body when the male buckle is disposed on the frame body.

7. The air filter of claim 5, wherein the male buckle comprises a lug and a buckle ring, the lug comprises a first end and a second end, the first end is pivotally disposed in the main body, the buckle ring is pivotally disposed in the first end of the lug, the female buckle has a hook-shaped member, the hook-shaped member is disposed in a distal end of the frame body, when the frame body closes the entrance hole, the buckle ring buckles with the hook-shaped member so that the frame body is fixed on the main body.

8. The air filter of claim 6, wherein the male buckle comprises a lug and a buckle ring, the lug comprises a first end and a second end, the first end is pivotally disposed in the main body, the buckle ring is pivotally disposed in the first end of the lug, the female buckle has a hook-shaped member, the hook-shaped member is disposed in a distal end of the frame body, when the frame body closes the entrance hole, the buckle ring buckles with the hook-shaped member so that the frame body is fixed on the main body.

9. The air filter of claim 3, wherein the air filter further comprises a control panel, the control panel is disposed on the main body, the control panel comprises a setting device and a warning device, the setting device can be used to define a pre-determined time of the second filter layer, the warning device connects to the setting device electrically, the setting device switches on the warning device when a use time of the second filter layer is over the pre-determined time.

10. The air filter of claim 4, wherein the air filter further comprises a control panel, the control panel is disposed on the main body, the control panel comprises a setting device and a warning device, the setting device can be used to define a pre-determined time of the second filter layer, the warning device connects to the setting device electrically, the setting device switches on the warning device when a use time of the second filter layer is over the pre-determined time.

11. The air filter of claim 1, wherein the air filter further comprises a control panel, the control panel is disposed on the main body, the control panel comprises a setting device and a warning device, the setting device can be used to define a pre-determined time of the second filter layer, the warning device connects to the setting device electrically, the setting device switches on the warning device when a use time of the second filter layer is over the pre-determined time.

12. The air filter of claim 2, wherein the air filter further comprises a control panel, the control panel is disposed on the main body, the control panel comprises a setting device and a warning device, the setting device can be used to define a pre-determined time of the second filter layer, the warning device connects to the setting device electrically, the setting device switches on the warning device when a use time of the second filter layer is over the pre-determined time.

* * * * *